(12) United States Patent
Sanches et al.

(10) Patent No.: US 7,080,858 B2
(45) Date of Patent: Jul. 25, 2006

(54) SEAWATER SUCTION HOSE AND METHOD

(75) Inventors: Luis Roberto Flores Sanches, Sao Paulo (BR); Waldir Pereira de Lucena, Sao Paulo (BR); Mauricio Pinto Spaolonzi, Sao Paulo (BR)

(73) Assignee: The Goodyear Tire & Rubber Company, Akron, OH (US)

(*) Notice: Subject to any disclaimer, the term of this patent is extended or adjusted under 35 U.S.C. 154(b) by 1 day.

(21) Appl. No.: 10/702,852

(22) Filed: Nov. 6, 2003

(65) Prior Publication Data

US 2005/0099002 A1    May 12, 2005

(51) Int. Cl.
 *F16L 31/00*    (2006.01)
(52) U.S. Cl. .............. 285/222.1; 285/222.2; 285/114
(58) Field of Classification Search ........... 285/222.1, 285/222.2, 222.4, 222.5, 114
See application file for complete search history.

(56) References Cited

U.S. PATENT DOCUMENTS

| | | | | |
|---|---|---|---|---|
| 471,266 A * | 3/1892 | Buscher | .............. | 285/114 |
| 643,685 A * | 2/1900 | Saunders | .............. | 285/114 |
| 701,214 A * | 5/1902 | Milner | .............. | 285/114 |
| 1,212,685 A * | 1/1917 | Robinson | .............. | 285/222.5 |
| 1,340,818 A * | 5/1920 | Brinkman | .............. | 285/222.5 |
| 1,371,981 A * | 3/1921 | Rose | .............. | 285/114 |
| 1,911,570 A * | 5/1933 | Holstein | .............. | 285/222.2 |
| 1,999,663 A * | 4/1935 | Paige | .............. | 285/114 |
| 2,260,537 A * | 10/1941 | Nelson | .............. | 285/222.1 |
| 2,640,502 A * | 6/1953 | Powers | .............. | 285/114 |
| 2,722,237 A * | 11/1955 | Rosel | .............. | 285/114 |
| 2,837,354 A | 6/1958 | Thibault et al. | .............. | 285/149 |
| 3,032,357 A * | 5/1962 | Shames et al. | .............. | 285/114 |
| 3,501,173 A * | 3/1970 | Linder et al. | .............. | 285/114 |
| 3,613,736 A | 10/1971 | Kawabara | .............. | 138/109 |
| 4,911,206 A * | 3/1990 | Gropp et al. | .............. | 285/114 |
| 5,246,254 A * | 9/1993 | LoJacono et al. | .............. | 285/114 |
| 5,390,961 A * | 2/1995 | Guthrie | .............. | 285/222.4 |
| 5,439,323 A * | 8/1995 | Nance | .............. | 285/114 |
| 5,813,467 A * | 9/1998 | Anderson et al. | .............. | 285/114 |
| 6,837,523 B1 * | 1/2005 | Surjaatmadja et al. | .............. | 285/114 |

FOREIGN PATENT DOCUMENTS

| | | |
|---|---|---|
| GB | 1517791 | 7/1978 |
| GB | 2081417 | 2/1982 |

* cited by examiner

*Primary Examiner*—David Bochna

(57) ABSTRACT

A flexible seawater suction hose is configured to include a tube body of flexible rubber material reinforced by textile fabric and steel wire. Opposite ends of the tube body are terminated to a respective connector. A steel cable is incorporated within the tube body and extends longitudinally between the opposite tube body ends and attaches to the opposite end connectors. The flexible hose connects at one end to a rigid conduit by means of one connector and extends downward therefrom to a prescribed depth to facilitate extraction of seawater at a desired temperature.

6 Claims, 1 Drawing Sheet

SEAWATER SUCTION HOSE AND METHOD

FIELD OF THE INVENTION

The subject invention relates generally to flexible suction hoses and, more specifically, to suction hose, systems, and methods for withdrawing seawater at a prescribed depth for the purpose of cooling surface platform equipment and devices.

BACKGROUND OF THE INVENTION

Offshore oil platforms use electricity generators that are cooled with heat exchangers. The heat exchangers collect seawater at a certain depth with steel piping and the water withdrawn at such depth is at a certain temperature level. The energy generation system is configured to shut down if its internal temperature exceeds a defined safety temperature level. It is desirable to avoid excessive temperatures in order to avoid the inconvenience and lost productivity of energy system down time.

There are basically two solutions to avoiding an automatic shut down situation. The first is to decrease the energy system temperature. The second is to invest at substantial cost in upgrading or replacing the heat exchangers for larger ones. For cost considerations, the first option is preferable. In order to reduce the energy system temperature, therefore, it is desirable to collect seawater at deeper depths where the seawater taken is at a lower temperature for cooling the energy generation system.

One solution to taking seawater at deeper depths is to extend the steel piping down to the desired depth. Such a solution, however, carries shortcomings. The extended steel piping may become too heavy for the platform structure. In addition, steel piping is relatively inflexible and a longer length of piping may fail when subjected to lateral forces imparted thereon by water pressure and current. A longer steel piping structure may also interfere with the underwater structure of some oil platforms.

Accordingly, there is a need for means and systems for extracting seawater at a greater depth. Such a solution should be capable of withstanding the forces at such depth and also not interfere with underwater platform structure. The ideal solution should also be economical to manufacture and utilize, easy to maintain, and be compatible with the existing platform structures currently in use.

SUMMARY OF THE INVENTION

The subject invention meets the needs of the industry by using a rubber hose extension line. The rubber hose line is still long and can reach the desired depth. The hose is light and flexible and will not, therefore, damage surrounding platform structure should contact occur. The hose further has high tensile strength that is required in the operation of the system. Finally, the hose is readily and economically manufactured and implemented and is compatible with existing platform structure and systems.

According to one aspect of the invention, a hose is provided consisting of a rubber tube reinforced with textile fabric and steel wire, with built in nipples at both hose ends. Steel cables are incorporated between the nipples and provides the requisite tensile strength resistance. The steel cables are mounted in the longitudinal direction of the hose and connect to the hose nipples so that the tensile strength forces can be held by the steel cables and the nipples. The steel cables are mounted inside the hose body, forming a compact and easily installed hose unit.

According to a further aspect of the invention, a heat exchange system for collecting water at a prescribed depth is achieved through the coupling of the flexible hose unit with a rigid conduit extending downward from a surface platform. The coupling is effected by engagement of the nipple at one end of the hose with the steel piping. Multiple segments of flexible hose may be linked to reach the optimal depth if desired.

According to a further aspect, a method for collecting water at a prescribed depth is achieved whereby the rigid conduit is connected to the surface platform; and the flexible conduit so configured pursuant to the invention is connected to the rigid conduit and extended to the desired depth.

BRIEF DESCRIPTION OF THE DRAWINGS

The invention will be described by way of example and with reference to the accompanying drawings in which.

DETAILED DESCRIPTION OF THE PREFERRED EMBODIMENTS

Figure 1:
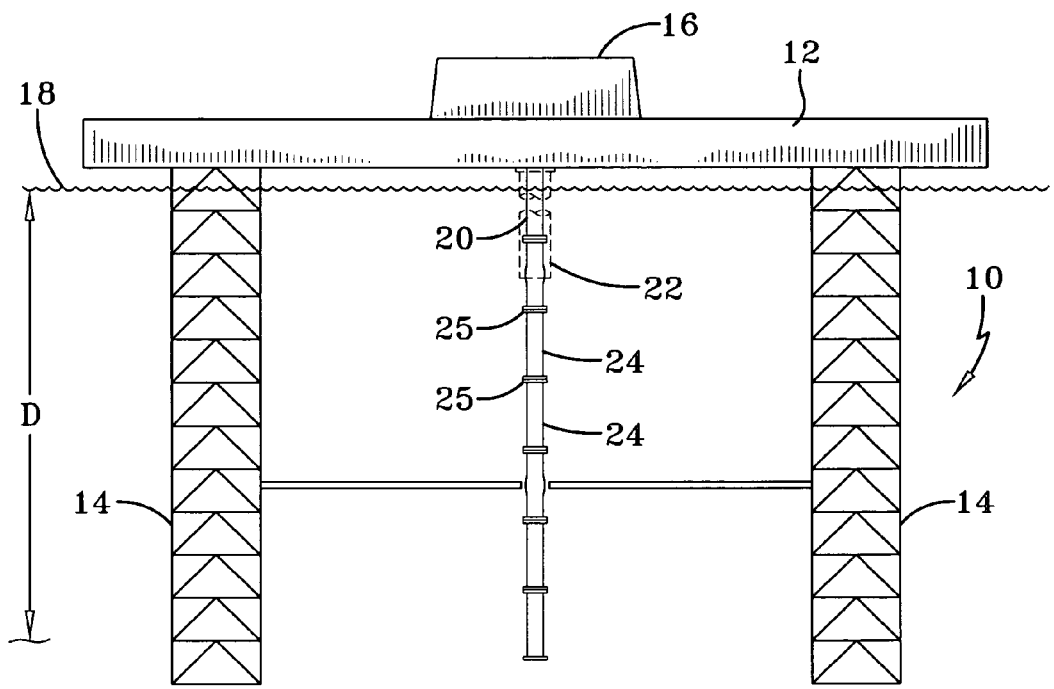
FIG. 1 is an side schematic view of an oil platform having the subject seawater suction hose system incorporated therein.

An oil platform system 10 is depicted schematically in FIG. 1 of a general type in common usage in the industry. The system 10 is typically located offshore in relatively deep seawater. An above-surface platform 12 is supported by multiple legs 14 and includes pumping equipment, transformers, and heat exchangers represented generally at block 16. The platform 12 is located above the water level 18

In connection with the operation of systems such as that shown at 10, the platforms utilize electricity generators for the operation of electrical equipment necessary in the performance of pumping activity. A significant level of heat is created through the operation of the generators and it is necessary to cool the generators by means of heat exchangers (not shown). The heat exchangers collect sea water at a certain depth by means of steel with steel piping 20 having a lower intake end 22. The water that is extracted through piping end 22 comes up at a certain temperature level. Water at lower depths, in general, is maintained at a lower temperature. In conventional platforms, steel piping 20 may extend to a nominal dept of 48 meters.

The energy generation system is designed to shut down if its internal temperature exceeds a defined safety temperature level. Shut down results in lost productivity and may result in equipment damage if shut down is delayed. In order to minimize the likelihood of a condition occurring that would result in shut down, upgraded heat exchangers may be deployed but at considerable investment cost. Alternatively, the piping 20 may be extended to a greater depth so as to extract water having a lower temperature. Lower temperature water will increase the cooling capability of the system and thereby minimize the prospect of a shut down condition.

While extending the piping 20 to a lower depth, in theory, is plausible, several obstacles are present. First, the piping 20 is relatively heavy and may become too heavy for the platform structure were it to be extended to a considerable depth. Secondly, a longer extension of the rigid piping 20 increases the risk that the piping will make inadvertent contact with underwater platform structure, resulting in damage to the piping, the platform structure, or both. Lastly, an obstacle to the use of a longer steel piping is that a rigid pipe is more susceptible to deflection from underwater currents. Such deflection can act to dislocate the rigid piping and result in a cooling system failure.

Pursuant to the invention, flexible hose segments (or interchangeably referred to as "tubes" herein) 24 are employed to extend the intake portal to a requisite depth. The hose segments 24 are connected together at joints 25 in sufficient number to reach the desired depth. A single hose segment 24 may be used for a shallower depth, but many applications will require the linking together of multiple hose segments in order to reach a desired depth "D".

Figure 2:
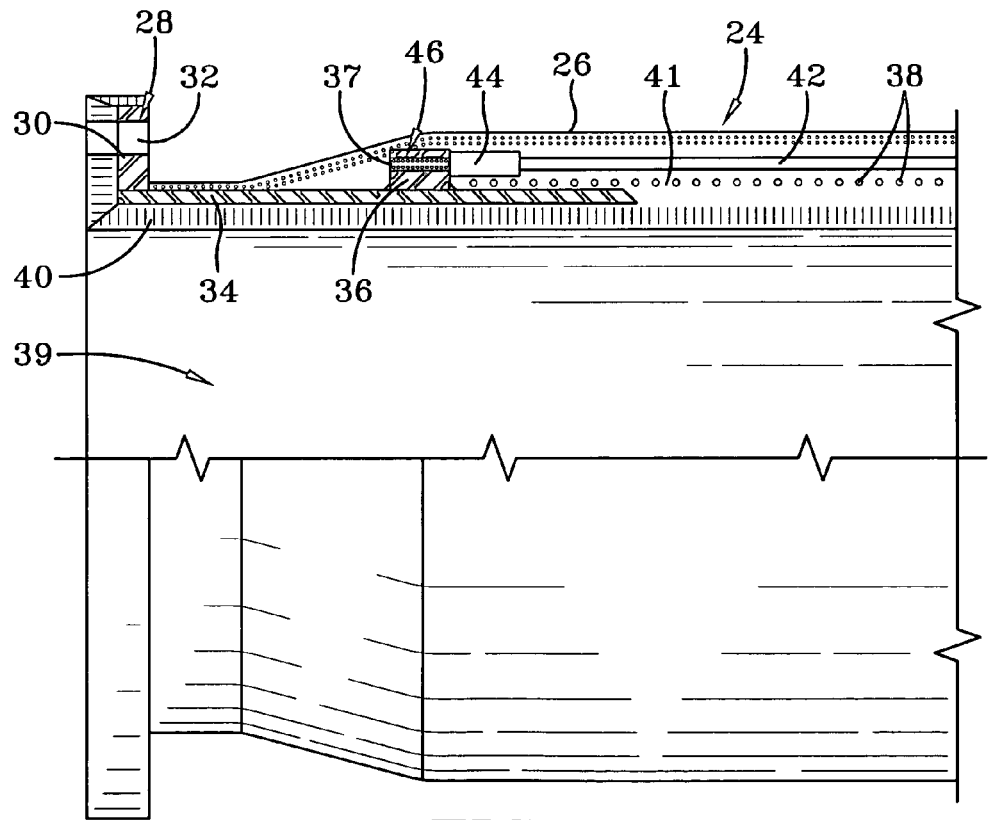
FIG. 2 is a side elevational view shown partially in section of a flexible hose segment end configured pursuant to the invention.

The configuration of each hose segment 24 is illustrated specifically in FIG. 2. Hose 24 is formed as an elongate hollow body 26 extending between a forward and a rearward (not shown), identically configured, nipple connector 28. The connector 28 is configured to provide an annular outwardly extending flange 30 at a forward end and an aperture 32 extends through flange 30 for the purpose of receiving an attachment hardware such as a bolt (not shown), whereby the nipple connector 28 of one hose segment may be connected to the nipple connector 28 of a like-configured second hose segment. An elongate connector sleeve 34 extends rearward from the flange 30. A nipple connector boss 36 projects outward from the sleeve 34 as shown, and a threaded bore 37 extends into boss 36 for a purpose explained below.

The hose body 26 is formed having wound reinforcement wires 38 therealong and a fabric reinforcement layer 40 disposed to face an axial bore 39 of the hose. The body 41 of the hose is conventionally formed of a rubber or rubber composite composition. One or more rigid steel cable(s) 42 is provided to extend axially along the hose body embedded within the rubber body 41. Cable 42 is formed of any suitably strong material such as steel. The cable 42 terminates at opposite ends to the nipple connectors of the hose 24. As will be appreciated from FIG. 2, the end of cable 42 specifically terminates to a cable connector body 44 that includes an adjustment bolt 46. The connector receives and retains the cable within connector body 44 while bolt 46 is threaded into the threaded nipple bore 37 of boss 36. The extent to which bolt 46 is threaded into bore 37 adjusts the tension on cable 42 between nipple connectors on opposite ends of the hose 24.

From the foregoing, it will be noted that the cable 42, anchored to the nipple connectors on opposite ends of the tube 24, supplies reinforcing strength to the tube 24 in the axial direction. The rubber hose or tube 24, or series of linked hoses, are long but still relatively light. Accordingly, undue stress on the platform from the hose weight is avoided. In addition, the hose segments 24 are flexible and generate a soft contact in the event that the hose engages platform structure below the water line. Also, the rubber hose has the ability due to the steel cable structure to support high tensile strength forces that may be generated in the operation of the system. Such flexibility also allows the hose or connected hose segments to withstand and resist forces acting thereon from water current. The tensile strength resistance is supported by steel cables 42 and the cables 42 are mounted in the longitudinal direction of the hose and connect both hose nipples so that the tensile strength forces can be held by the steel cables and the nipples. The steel cables are mounted within the suction hose body, forming a very compact and handy hose unit. The tensile strength resistance may be adjusted by varying the degree of tension under which the steel cables are placed within the hose structure.

In one aspect of the invention, an improved suction hose for deep seawater extraction is provided comprising a tube body composed of a flexible rather than rigid material. The tube body may be reinforced with fabric and wire as described above, and support means in the form of one or more steel cables is provided extending longitudinally and terminated at a nipple connector. The hose segment is further incorporated into a heat exchange system wherein the flexible hose is coupled to the rigid piping or conduit and extends downward therefrom to the requisite depth. Still further, the invention comprises a method for utilizing one or more flexible hose(s) in combination with the rigid steel piping in effecting an extraction of colder seawater at a requisite depth. The flexible hose segments are identically fabricated and may be linked together to form a continuous change. By creating the desired length of hose from a series of connected hose segments, the system is flexible to extract water at varying depths. Moreover, manufacturing hose segments in identical configurations is efficient and results in a lower manufactured cost to the end user.

While the above describes a preferred embodiment of the invention, the invention is not intended to be so limited. Other embodiments that will be apparent to those skilled in the art and which utilize the teachings herein set forth, are intended to be within the scope and spirit of the invention. Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A suction hose for deep seawater extraction comprising:
   a tube body composed of a flexible material and having a connector affixed to at least one end;
   reinforcement means disposed within the tube body;
   support means extending longitudinally along and embedded within the tube body and having one end attached to the connector; and
   adjustment means for adjusting the tension within the support means within the tube body;
   wherein the reinforcement means comprises a textile fabric and at least one steel wire.

2. A suction hose for deep seawater extraction comprising:
   a tube body composed of a flexible material and having a connector affixed to at least one end;
   reinforcement means disposed within the tube body;
   support means extending longitudinally along and embedded within the tube body and having one end attached to the connector; and
   adjustment means for adjusting the tension within the support means within the tube body;
   wherein the tube body has first and second connectors at opposite ends and the support means comprises at least one cable extending longitudinally within the tube body and having opposite ends attaching to radially projecting first and second boss flanges of the first and second connectors respectively.

3. A suction hose for deep seawater extraction comprising:
- a tubular hose body composed of a flexible material and having a connector affixed to at least one end, the connector having a radially outward projecting boss flange;
- at least one elongate reinforcement member extending longitudinally along and embedded between layers of the tubular body spaced radially a distance from a longitudinal center axis of the tubular hose body; and
- the reinforcement member having a first end affixed into the tubular body outwardly projecting boss flange;
- wherein the reinforcement member has a second end affixed to a radially outward projecting boss flange of a second connector affixed to an opposite end of the tubular body; and wherein further comprising adjustment means for adjusting the tension within the reinforcement member first and second ends.

4. A suction hose according to claim 3, wherein the adjustment means axially adjusts the relative position of the reinforcement member first end to the first connector boss flange.

5. A suction hose for deep seawater extraction comprising:
- a tubular body composed of a flexible material and having a connector affixed to at least one end;
- at least one reinforcement member embedded longitudinally substantially the length of the tubular body and spaced radially a distance from and extending substantially parallel to a longitudinal center axis of the tubular body; the reinforcement member having a first end connected to the tubular body connector; and means for adjusting the tension in the reinforcement means, wherein the connector has a radially outward projecting boss flange, and the reinforcement member first end extending into the connector boss flange.

6. A suction hose for deep seawater extraction comprising:
- a tubular body composed of a flexible material and having a connector affixed to at least one end;
- at least one reinforcement member embedded longitudinally substantially the length of the tubular body and spaced radially a distance from and extending substantially parallel to a longitudinal center axis of the tubular body; the reinforcement member having a first end connected to the tubular body connector; and
- means for adjusting the tension in the reinforcement means, wherein the means for adjusting the tension in the reinforcement means comprises a screw threaded connection between the reinforcement means first end and a connector boss flange.

\* \* \* \* \*